United States Patent [19]

DeChristopher

[11] Patent Number: 4,944,596
[45] Date of Patent: Jul. 31, 1990

[54] APPARATUS WITH ROLLER FOR KNEADING A PROOFED BALL OF DOUGH

[76] Inventor: Eugene L. DeChristopher, 20 Ahlstrom Rd., Cotati, Calif. 94928

[21] Appl. No.: 408,918

[22] Filed: Sep. 18, 1989

[51] Int. Cl.⁵ .............................................. B29B 1/06
[52] U.S. Cl. ..................................... 366/69; 29/110.5; 29/121.1; 99/450.1
[58] Field of Search ................ 99/450.1, 348; 366/69, 366/71–73, 348, 349, 342, 343; 426/443; 29/110.5, 121.1, 121.2, 121.5–121.8, 125; 7/111

[56] References Cited

U.S. PATENT DOCUMENTS

| | | | |
|---|---|---|---|
| 819,772 | 5/1906 | Latham | 366/69 |
| 1,162,425 | 11/1915 | Wilcox | 29/110.5 |
| 1,370,383 | 3/1921 | Tischer | 29/121.5 |
| 1,730,520 | 10/1929 | McMurray | 29/121.2 |
| 2,490,616 | 12/1949 | Brabazon | 29/110.5 |
| 2,683,428 | 7/1954 | Neal | 99/450.1 |
| 3,389,466 | 6/1968 | Parris | 29/121.2 |
| 3,846,221 | 11/1974 | Golec | 29/121.8 |
| 4,197,794 | 4/1980 | Raque et al. | 99/450.1 |
| 4,718,769 | 1/1988 | Conkey | 366/69 |
| 4,815,859 | 3/1989 | Weinkle | 366/69 |

FOREIGN PATENT DOCUMENTS 665566 1/1952 United Kingdom ............... 29/110.5

Primary Examiner—Timothy F. Simone
Attorney, Agent, or Firm—Melvin R. Stidham

[57] ABSTRACT

Apparatus for kneading proofed dough balls into pizza shells includes a conveyor belt and a generally cylindrical roller extending across the width of the belt. The roller has a core made up of a plurality of polygonal segment rings placed side to side to rotate with a central shaft, and on each side of such polygonal segment there is a protrusion constituting about three-fourths of a sphere. The polygonal segments are staggered when placed on the central shaft so that the spherical protrusions nest closely together to impress a plurality of spherically concave dimples across the full width of the dough ball as it is flattened out.

5 Claims, 2 Drawing Sheets

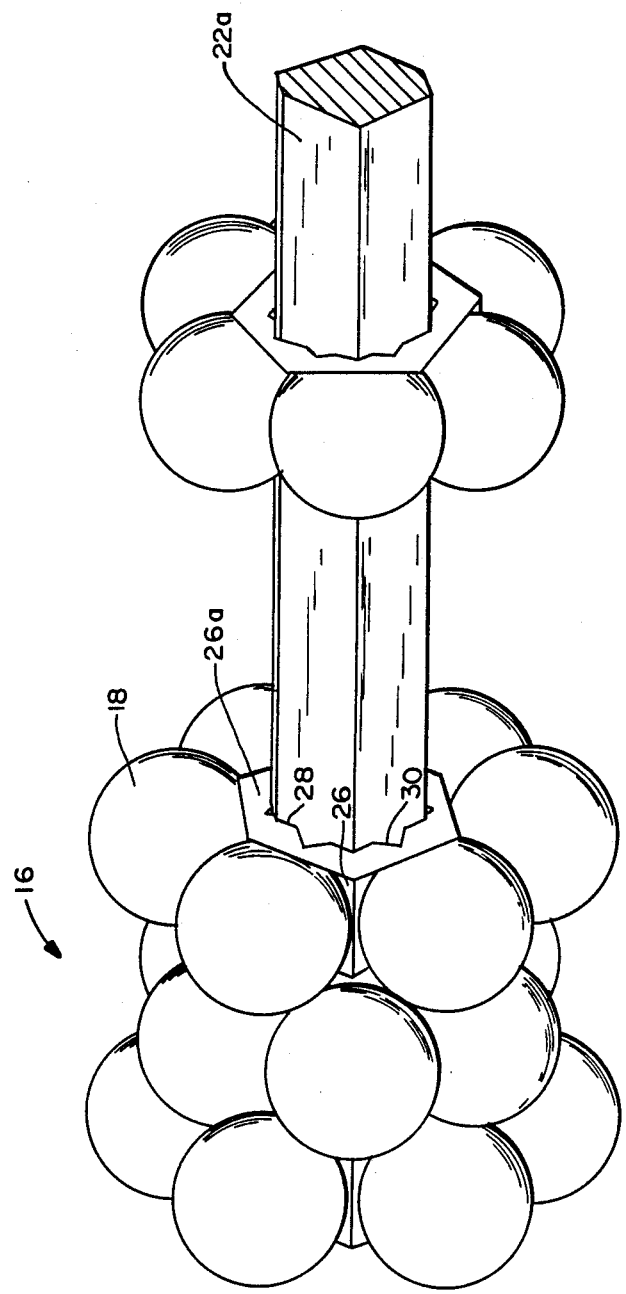

APPARATUS WITH ROLLER FOR KNEADING A PROOFED BALL OF DOUGH

BACKGROUND OF THE INVENTION

Traditionally, a pizza shell has been formed by pressing, kneading and stretching a ball of proofed dough into a relatively thin shell with a relatively thick rim. Generally, efforts to mechanize the process of kneading dough for pizza shells have not been successful in that they do not effect the manipulations of the human fingers. Some such processes involve passing the dough through a pair of rollers arranged in the nature of a washing machine wringer. Any gas pockets in the dough tend to be flattened and ruptured and the pizza shell is not light and fluffy but are rather, flat and uninteresting. A hand operated roller configured to similate hand kneading and shaping of a pizza shell has been disclosed in U.S. Pat. No. 4,815,859 for "Roller For Making Pizza Shell". The roller there illustrated and described has a plurality of rounded knobs arranged in staggered rows around the cylindrical surface. However, such knobs are not closely nested and are generally not suitable for an automated production line for pizza shells wherein a dough ball may be completely formed, stretched, kneaded and reduced in thickness to the desired degree in a single pass of the dough under the roller.

OBJECTS OF THE INVENTION

It is an object of this invention to provide a roller for forming a pizza shell which is capable of forming, kneading and stretching the dough in a single traversal of the dough ball under the roller.

It is a further object of this invention to provide a roller with smooth, spherical protrusion, which are closely nested for a thorough kneading of the dough ball.

It is a further object of this invention to provide a roller for dough with extremely closely nested spherical protrusions, which can be easily separated for cleaning.

Other objects and advantages of this invention will become apparent from the description to follow, particularly when read in conjunction with the accompanying drawings.

SUMMARY OF THE INVENTION

In the apparatus of this invention, dough balls are carried by a conveyor under a rotating roller that kneads, stretches and forms the dough. The roller comprises a segmented central core, which is formed by arranging a plurality of rings side by side. Each ring carries a plurality of sphere around its circumference with more than half of each sphere protruding above the ring. The ring are disposed side by side in staggered relation so that the spheres, which overlap adjacent rings, are closely nested. Consequently, virtually the entire surface of the dough is engaged and pressed by spherical protrusions though, of course, the contour of the spheres causes some portions of the dough to be pressed deeper than others. The result is a pizza shell of reduced thickness and with a smooth, but irregular, dimpled surface in which pockets of gas remain for expansion during the baking process.

BRIEF DESCRIPTION OF THE DRAWINGS

In the drawings:

FIG. 3 is a partial view in perspective showing the forming roll during assembly or disassembly.

DESCRIPTIONN OF A PREFERRED EMBODIMENT

Figure 1:
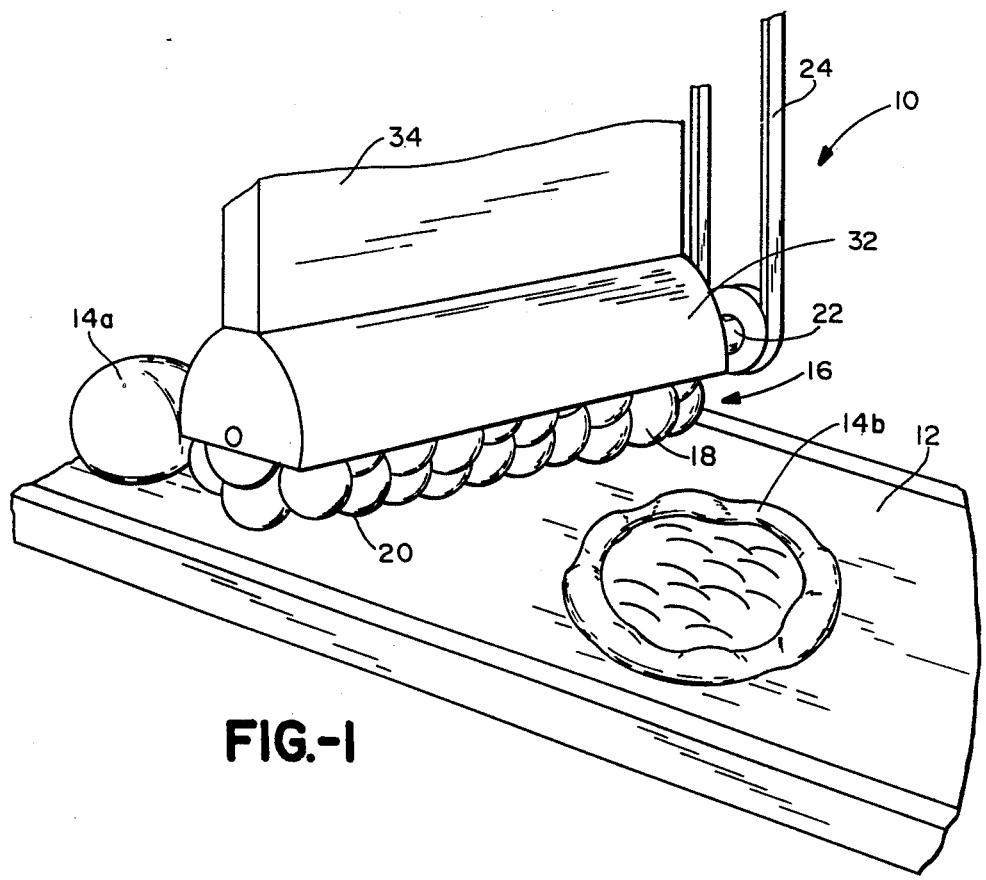
FIG. 1 is a view in perspective showing apparatus of this invention for forming pizza shells on a production basis.
Figure 2:
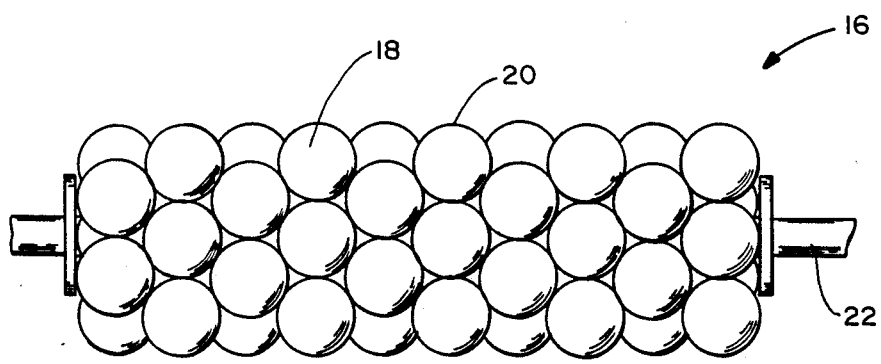
FIG. 2 is an elevation view of the forming roller forming part of this invention.

Referring now to FIG. 1 with greater particularly, the pizza shell kneading and forming apparatus 10 of this invention, includes a suitable conveyor belt 12 on which a plurality of proofed dough balls 14a are transported in sequence to be stretched, kneaded and reduced in thickness to a pizza shell 14b, which is thereafter covered with suitable sauces, cheeses, fillings and the like prior to baking.

The apparatus 10 includes as a principal component, the pizza forming roller 16 of this invention, being generally cylindrical in form with a plurality of spherical protrusions 18, which are closely nested to engage and work virtually the entire surface of the pizza dough 14a. The spherical protrusions 18 are arranged within a generally cylindrical profile 20 and, as will be described are carried to rotate with a shaft 22, that is driven by any suitable means, such as a belt 24.

Referring now to FIG. 3, the knobbed roller 16 of this invention is carried on a segmented core 26 formed by a plurality of ring-like polygonal members 26a arranged side by side along a non-circular portion 22a of the shaft 22, so as to rotate therewith. The polygonal rings 26a are formed with angularly related internal surfaces 28 and 30 so that successive rings 26a may be staggered relative to adjacent rings 26a, whereby the balls or spherical protrusions 18 are closely nested. In that connection, the spheres 18 are preferably of a diameter which is larger than the thicknes of the ring 26a so that the spherical protrusions 18 will overlap the adjacent rings 26, allowing even closer nesting. Particularly with the close nesting of spheres 18, virtually the entire surface of the dough ball 14a is pressed and kneaded to varying degrees, and the kneading is completed in a simple pass of the dough ball.

More than one-half, and preferably about three-fourths, of each sphere 18 protrudes about the surface of the ring 26a. The spherical surfaces 18 impress smooth dimples into the dough 14a to press the dough into a smooth, undulating surface without flattening the dough into a thin sheet from which will gas has been driven. As shown in FIG. 3, the polygonal rings or segments 26a may be along the shaft 22a and thereby separated to facilitate washing.

As shown in FIG. 1, the roller 16 is preferably covered with a hood or cowling 32 that prevents the roller 16 from projecting flour and other particles into the atmosphere, and also provides a medium through which olive oil or other additives amy be applied through a duct 34.

While this invention has been described in conjunction with a preferred embodiment thereof, it is obvious that modifications and changes therein may be made by those skilled in the art to which it pertains without departing from the spirit and scope of this invention, as defined by the claims appended hereto.

What is claimed as invention is:

1. A roller for kneading a proofed dough ball into a pizza shell comprising:

a shaft;

an elongated core member, comprising a number of rings keyed onto said shaft side by side, mounted for rotation about a longitudinal axis; and a plurality of annular rows of spherical protrusions on said core member along the length thereof;

there being a row of spherical protrusions around each of said rings;

the spherical protrusions on each of said rings being staggered relative to the spherical protrusions are closely nested;

at least some of said protrusions being in the configuration of more than one-half of a sphere extending above the surface of said core member;

each of said rings being of a width less than the diameter of said spherical protrusions.

2. The roller defined by claim 1 wherein:
said protrusions comprise about three-fourths of a sphere.

3. The roller defined by claim 1 wherein:
each of said rings has a polygonal outer periphery;
one of said spherical protrusions being on each face of said polygonal periphery.

4. Apparatus for kneading proofed dough balls into pizza shells comprising:

a conveyor belt adapted to move a plurality of dough balls in series; and a roller in the general configuration of a cylinder extending across said conveyor belt, said roller comprising;

a shaft;

an elongated core member comprising a number of rings keyed onto said shaft side by side mounted for rotation about a longitudinal axis; and a plurality of annular rows of spherical protrusions on said core member along the length thereof;

there being a row of spherical protrusions around each of said rings;

each of said rings being of a width less than the diameter of said spherical protrusions;

the spherical protrusions on each of said rings being staggered relative to the spherical protrusions of adjacent rings so that said protrusions are closely nested;

at least some of said protrusions being in the configuration of more than one-half of a sphere extending above the surface of said core member.

5. The apparatus defined by claim 4 wherein:
said protrusions comprise about three-fourths of a sphere.

* * * * *